United States Patent [19]
Balcerowski et al.

[11] Patent Number: 6,101,545
[45] Date of Patent: *Aug. 8, 2000

[54] MESSAGE HANDLING SYSTEM FOR DIFFERENT MESSAGE DELIVERY TYPES

[75] Inventors: John P. Balcerowski, Friendwood; Milton Dunnam, Baytown, both of Tex.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/734,213

[22] Filed: Oct. 21, 1996

[51] Int. Cl.[7] .................................. H04J 3/02; G06F 9/00
[52] U.S. Cl. ..................... 709/230; 709/228; 709/231; 709/236; 370/464; 370/468; 395/500
[58] Field of Search ............ 395/200.6, 200.32–200.38, 395/200.61, 200.62, 200.66, 200.75, 500, 200.1, 500.464; 364/200, 300; 370/249, 85.13, 60, 68.1, 60.1, 58.1, 58.2, 58.3, 252, 448, 232, 465, 468; 379/90, 201; 709/228, 230, 236, 300, 235, 231

[56] References Cited

U.S. PATENT DOCUMENTS

| | | | |
|---|---|---|---|
| 4,654,654 | 3/1987 | Butler et al. | 340/825.5 |
| 4,766,534 | 8/1988 | DeBenedictis | 395/200.58 |
| 5,056,058 | 10/1991 | Hirata et al. | 364/900 |
| 5,058,110 | 10/1991 | Beach et al. | 370/85.6 |
| 5,363,501 | 11/1994 | Pullela | 395/500 |
| 5,381,413 | 1/1995 | Tobagi et al. | 370/85.6 |
| 5,608,720 | 3/1997 | Biegel et al. | 370/249 |
| 5,761,486 | 6/1998 | Watanabe et al. | 395/500 |
| 5,784,622 | 7/1998 | Kalwitz et al. | 395/200 |

*Primary Examiner*—Dung C. Dinh
*Assistant Examiner*—Quoc-Khanh Le
*Attorney, Agent, or Firm*—Bradley K. Lortz; Vijayalakshmi D. Duraiswamy; Michael W. Sales

[57] ABSTRACT

An message handling system for handling the delivery of critical and time critical messages for a near-real-time or real-time simulation environment. A message delivery type (38) accompanies each message (34) to designate whether the message (34) is delivery critical (46) or time critical (42). A message receiver (50) receives the message (34). A message delivery selector (58) selects a protocol based on the message delivery type (38) as determined by a message type determinator (54). The selected protocol conforms to a message format which has a common header and a message component. The message (34) is then sent to the intended recipient computer via the selected protocol.

3 Claims, 12 Drawing Sheets

MESSAGE HANDLING SYSTEM FOR DIFFERENT MESSAGE DELIVERY TYPES

BACKGROUND OF THE INVENTION

1. Field of the Invention

The present invention relates generally to network communications and more particularly to protocols used in delivering messages over a network.

2. Discussion of Related Art

Networking of computers is commonplace and many different communication protocols have been developed. Transmission Control Protocol/Internet Protocol (TCP/IP) is one of these communication protocols that is commonly employed. TCP/IP is comprised of a suite of protocols including TCP and User Datagram Protocol (UDP). TCP provides a reliable end-to-end transport service with its attendant overhead while UDP provides an efficient, but unreliable end to end transport service.

Two types of messages which networks transport include delivery critical messages and time critical messages. Networks which transport delivery critical messages need protocols which assure the sending computer that its delivery critical messages were in fact delivered to the proper recipient. Correspondingly, networks which transport time critical messages need protocols which expeditiously provide the proper recipient computers with the messages since the value of time critical messages diminishes over time. Typically, it is better to send an updated message than to timeout and resend a stale time critical message.

The TCP/IP and the UDP protocols offer offsetting disadvantages in transporting time critical and delivery critical messages. While TCP/IP provides certain assurances which UDP does not that a delivery critical message will ultimately reach the proper recipient computer, TCP/IP is less efficient than UDP in transporting messages which is a feature needed for transporting time critical messages. Present networks lack protocols which can effectively handle both the time critical and the delivery critical messages.

SUMMARY OF THE INVENTION

The present invention is a message handling system for delivering a message between a first computer and a second computer over a network. This message handling system includes a message receiver for receiving the message from the first computer with the message having a message delivery type field being indicative of a delivery characteristic. Also, the message handling system includes a message type determinator being coupled to the message receiver for determining the message delivery type of the message. A message delivery selector which is coupled to the message type determinator selects a delivery protocol from a predetermined group of delivery protocols based upon the message delivery type field of the message. Furthermore, a message transporter coupled to the message delivery selector transports the message to the second computer using the selected delivery protocol.

DESCRIPTION OF THE PREFERRED EMBODIMENTS

Figure 1:
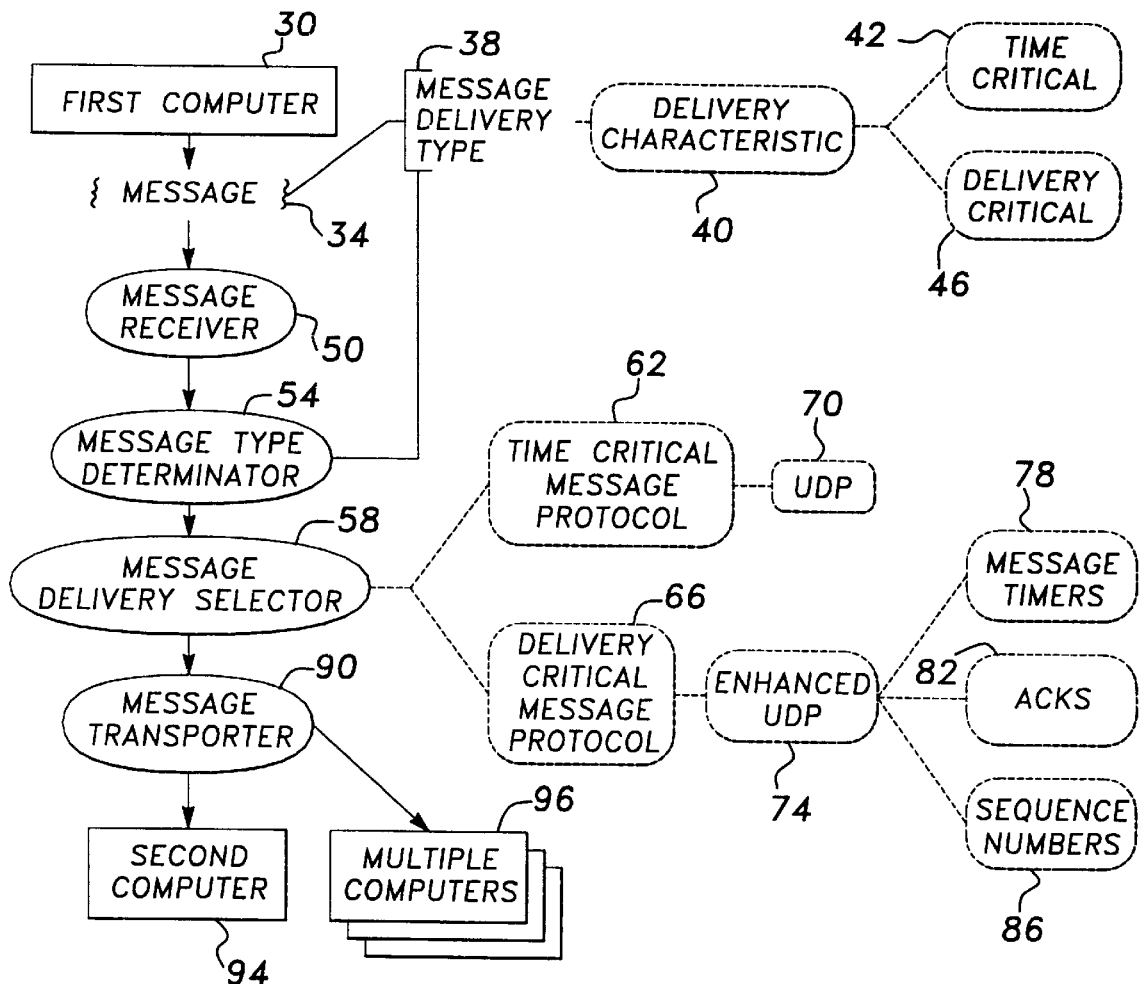
FIG. 1 is an entity relationship diagram depicting the interrelationships which exist among the components of the present invention.

FIG. 1 is an entity relationship diagram which shows the relationships which exist among the components of the present invention's message handling system. A first computer 30 is to send message 34 to a second computer 94. The message 34 has a message delivery type 38 which has values based on a delivery characteristic 40. The delivery characteristic 40 includes the delivery being characterized as time critical 42 or delivery critical 46.

First, the message 34 is received by a message receiver 50 and has its message delivery type 38 analyzed by a message type determinator 54. A message delivery selector 58 determines what protocol to transport the message based upon the analyzed message delivery type 38.

The message delivery selector 58 selects different protocols based upon which one most effectively handles the particular message delivery type of the message 34. Accordingly, a protocol which most effectively handles time critical messages is selected as the present invention's time critical message protocol 62. A protocol which most effectively handles delivery critical messages is selected as the present invention's delivery critical message protocol 66.

The preferred embodiment uses UDP 70 for handling time critical messages and an enhanced UDP 74 for handling delivery critical messages. The enhanced UDP 74 is a modified version of the existing UDP with additions to make it more reliable. Such additions include message timers 78, acknowledgments 82, and sequence numbers 86. Lastly, a message transporter 90 transports the message to the second computer 94 via the protocol selected by the message delivery selector 58. Also, the message transporter 90 can multicast the message 34 to multiple computers 96 if instructed to do so by the first computer 30.

Figure 2:
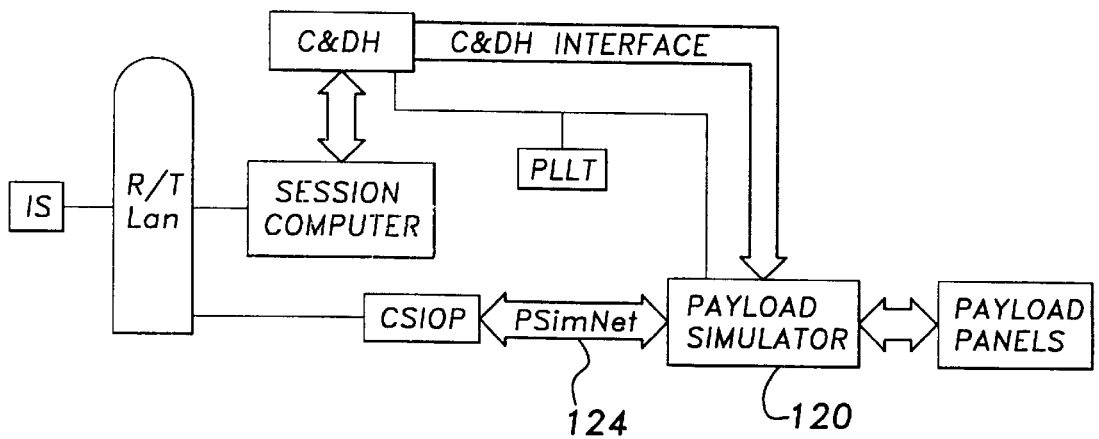
FIG. 2 is a network schematic showing the general arrangement of the computers and their interfaces with the present invention.

The use of the present invention within the environment of a simulator serves only to more fully describe the present invention and not to limit the scope of its application. FIG. 2 shows the example of the present invention as used by the NASA Space Station Training Facility (SSTF).

The SSTF contains payload simulators and a simulator controller connected in a network arrangement. The payload simulators simulate the operations of the various payloads of the Space Station. The SSTF example terms the message handler of the present invention the "Practical Simulator Network" and is abbreviated "PSimNet."

For the SSTF example, the payload simulator 120 is controlled over the PSimNet 124. Data exchanged between Space Station systems and the payload simulator 120 is also communicated over the PSimNet 124. The payload simulator 120 may have an interface handler that will interpret mode requests from the SSTF and react appropriately.

There are five main types of data that are exchanged over the PSimNet:

Mode Requests

Time Synchronization Data

1. Station Systems Status and Data

2. Payload System Status and Data

3. Instructor Controls

Figure 3:
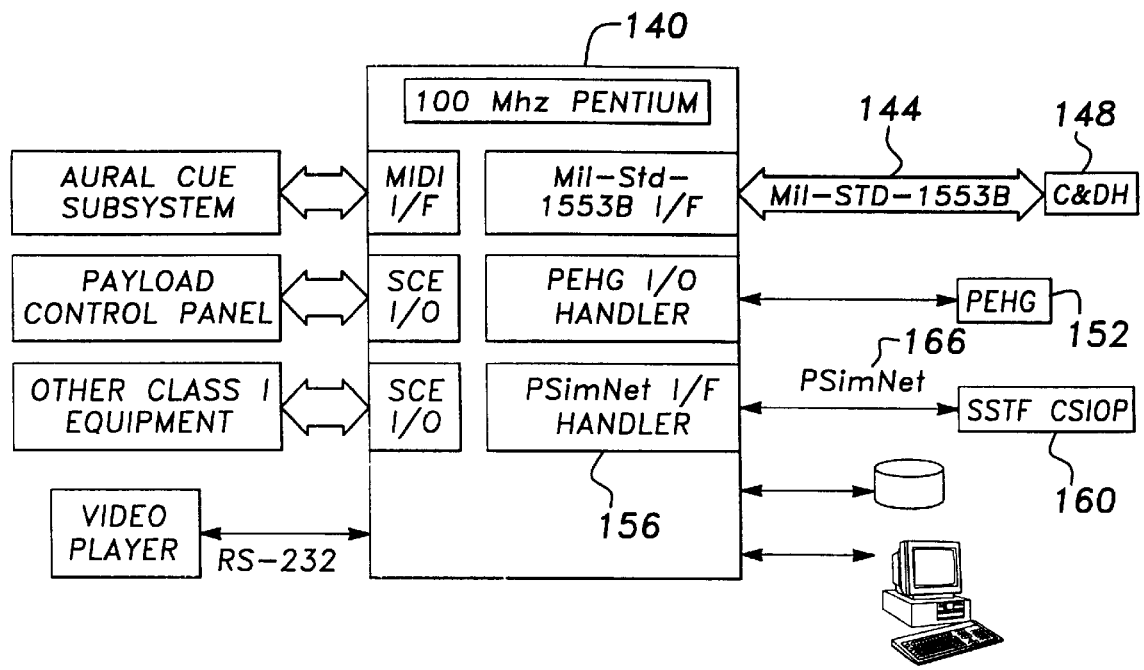
FIG. 3 is a schematic block diagram of a payload simulator.

For the SSTF example, a typical payload simulator is shown in FIG. 3. The notional payload simulator is based on a 100 Mhz Pentium IBM compatible micro computer 140 in a rack mountable case with an I/O expansion chassis. Any modern computer platform may be used and the use of POSIX based Sun Sparc Stations and SGI platforms can also be used as well as PC based platforms.

The main external interfaces remain as shown with: the Mil-Std-1553B 144 providing an interface to the SSTF communication and data handling system (C&DH 148); an Ethernet to the Payload Ethernet Hub Gateway (PEHG 152) for interface with other payload simulators and laptop computers used to control payloads (real world interface) and a PSimNet Interface handler 156 providing the Mode Request and message interface to the SSTF Crew Station I/O Processor (CSIOP 160) via the PSimNet 166.

Figure 4:
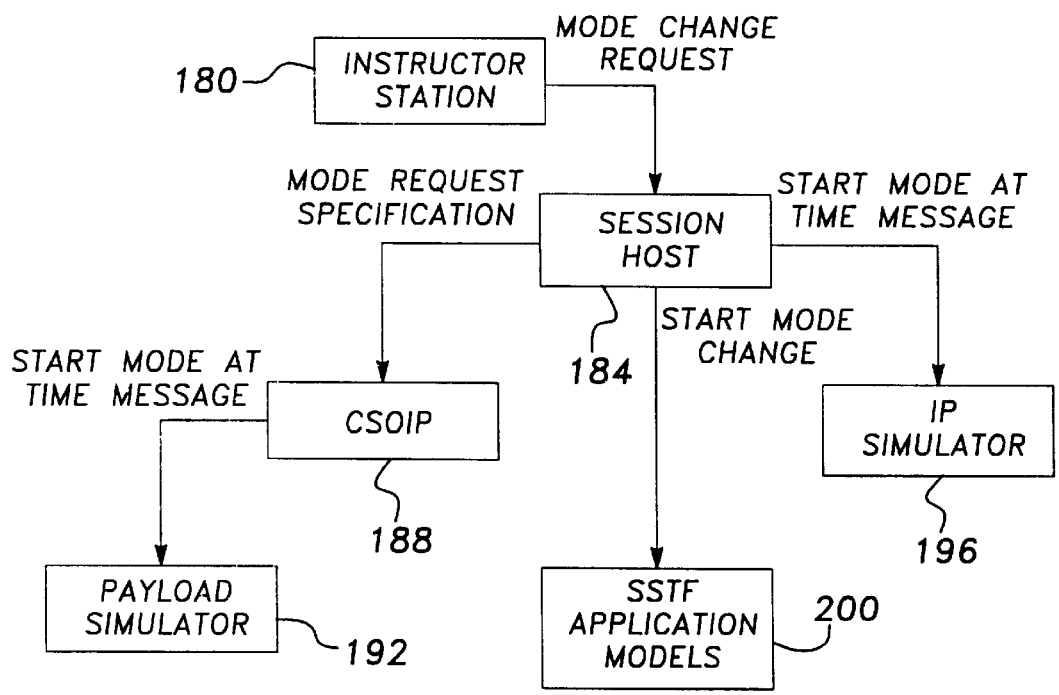
FIG. 4 hierarchical diagram showing the mode of control hierarchy.

The SSTF has a priority scheme for executing mode changes. The mode control hierarchy is shown in FIG. 4. Mode Changes originate at the Instructor Station 180 with a Mode Change Request invoked by an instructor. The Session Host 184 receives this message and builds a mode request specification that determines the time at which the mode change should be executed for each device being controlled. Generally, one mode request specification is built for each device taking into account characteristics of the device and latency in receiving the mode change request message. This is done to ensure the best possible synchronization between devices during mode changes. The mode request specifications are sent to the CSIOP 188 for control of a payload simulator 192. At the same time, the Session Host 184 builds a Mode Change Request message based on the Mode Request Specification for the International Partner's (IP) simulator 196. The IP simulator may be a simulator for space station Japanese Experimental Model (JEM), Columbus Orbited Facility (COF, European Module) or Russian Space Agency (RSA) module. The Session Host then invokes a mode change to the SSTF application models 200. The SSTF application models may be models for any space station core system such as the Electrical Power System (EPS), Thermal Control System (TCS), etc.

Payload mode control and message passing are achieved over the PSimNet. In the SSTF example, PSimNet utilizes the Ethernet physical protocol; however, the present invention could be implemented with FDDI, SONET, or any other common physical protocol.

The High Level Protocol completes the interface model. The high level protocol is provided by a SSTF unique application that operates with the Ethernet TCP/IP protocol suite. This application, called the PSimNet Interface Agent, incorporates the SSTF unique features. There is also a complementary application on the Payload simulator side of the interface called the PSimNet Interface Handler. Both applications work together in conjunction with the TCP/IP protocol to complete the end-to-end virtual circuit that makes up the interface.

The CSIOP PSimNet Agent builds mode control messages, data messages, controls data flow on the interface, and provides the interface between the PSimNet and the SSTF application models. The PSimNet Interface Handler provides message interpretation, acknowledgment and message building on the Payload simulator side of the interface. To build a foundation for a more detailed discussion on these applications, the structure of the different messages that traverse the PSimNet is discussed below.

Mode Control requests originate at the Instructor Station as instructor actions. Mode changes are passed to application partitions by way of the Software Backplane. The mode state diagram is presented in FIG. 5.

Figure 5:
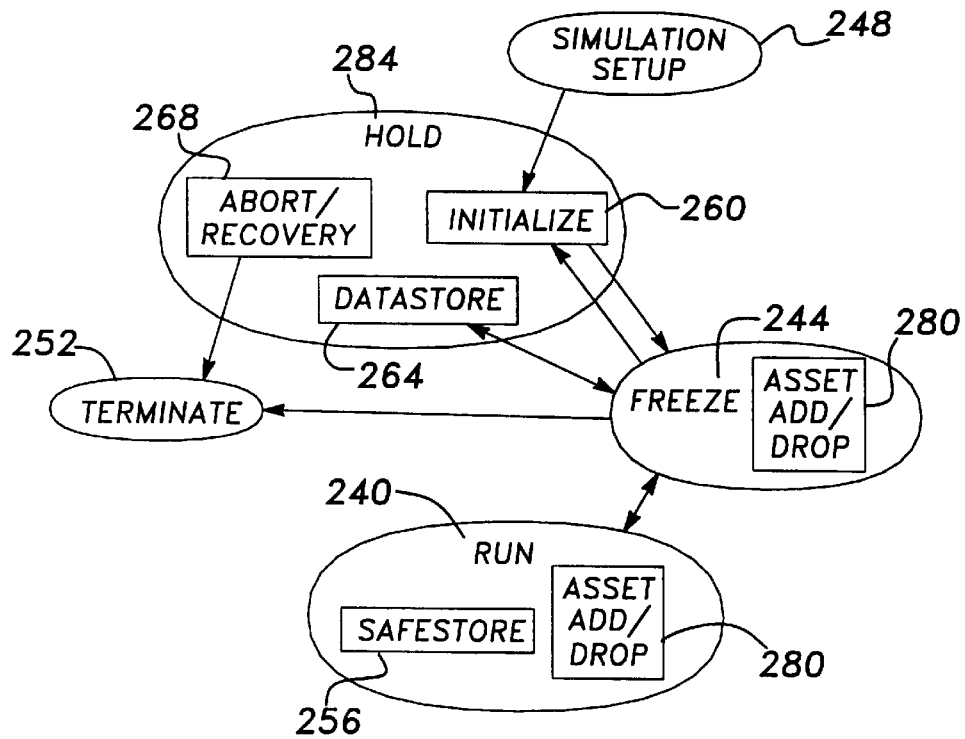
FIG. 5 is a mode state diagram showing the various modes within the Space Station Training Facility example.

Referring to FIG. 5, SSTF Modes are broken down into two categories: Major Modes and Sub-mode processes. The Major Modes are Run 240, Freeze 244, Simulation Setup 248 and Terminate 252. Sub-mode processes can only be performed within major modes. Sub-mode Actions are Safestore 256, Initialize 260, Datastore 264, Abort/Recovery 268, and Add/Drop Asset 280. Hold 284 is a transient state that the SSTF enters while performing certain processes.

A system is typically never commanded to Hold 284. Likewise, a system is typically never commanded to Abort/Recovery 268. Abort/Recovery 268 is automatically entered when an exception goes unhandled. The SSTF will attempt to recover from a processing exception. If it fails to recover, the system will automatically pass control to Terminate 252.

The SSTF assets mentioned above refer to SSTF components that can be configured for a session. The CSIOP is an asset for example.

The Run command directs the simulation exercise to transition to the Run mode of operation (state) at the designated time. In the Run mode, the simulation exercise is progressing in real-time. Simulation values for consumables and state variables are updated to represent changes as they would occur in the corresponding ISS flight element.

The Freeze command directs the simulation exercise to transition to the Freeze mode at the designated time. In the Freeze mode, the simulation exercise is frozen in time. Simulation values for consumables and state variables are held constant. In other words, the integration factor, delta time, is set to 0. Simulation models are generally cycling and respond to instructor inputs and panel switch changes.

The Initialize command directs the simulation exercise to initialize itself to another state as determined by the selected Initial Conditions (IC) point (also known as a Datastore point). Initialize is sometimes referred to as Return-to-Datastore. It is considered a transitory simulation mode. The training session will remain in the transitory initialize mode until all assets have completed their initialization process, or until a time-out occurs. The Payload Trainers/Simulators (PTSs) are considered to be a part of the CSIOP asset, meaning that the CSIOP will not report initialization complete until all active PTSs have reported that their initialization is complete, or a time-out occurs. The training session will automatically enter the Freeze mode upon completing the initialization process.

Before the training exercise begins, the training load is brought up with only enough terms initialized to ensure stability. The Instructor then issues an Initialize command for a chosen IC point to prepare for the desired training situation.

The Datastore command directs the simulation to create an IC point representing the state of the simulation exercise at the designated point in time. IC points are named and stored in a file for subsequent retrieval by an Initialize command.

Datastore can only be commanded in Freeze. The training session will remain in the transitory Datastore mode until all assets have completed their Datastore process, or until a time-out occurs. The training session will then return to Freeze.

Each Datastore point represents a consistent set of IC parameter values across all assets and simulators in the training session. Each PTS IC point number is associated with the corresponding SSTF Datastore data. Each PTS maintains a cache of usable IC numbers. At initialization and after each Datastore, each PTS provides the next IC available, i.e. unused number to the CSIOP PSimNet Agent. When a Datastore is performed, the set of numbers for corresponding PTS IC points will be recorded along with the SSTF Datastore data. When the SSTF returns to an IC point, the CSIOP PSimNet Agent will inform each PTS of the matching IC number.

At the end of a training session, IC points no longer needed are identified so that they can be discarded if so desired.

Safestore is a feature of the SSTF that enables the current training session to be restarted at a recent point in time if the session terminates abnormally. Safestore software periodically records time dependent data in real-time. The default recording interval is 15 minutes. Safestore are not commanded from an IOS, but the IOS can be used to change the Safestore interval from the default value. The CSIOP PSimNet agent detects when the SSTF is automatically taking a Safestore point and generates a message to each PTS notifying them to record Safestore data and store it in the specified Safestore data set.

The last four Safestore points are retained during a training session, and are available if the session terminates abnormally. Safestore data is typically not retained when a training session terminates normally. After a training session abnormally terminates, one of the Safestore points is selected to be used to restore the session. The session is initialized to the closest previous Datastore point and the Safestore data is overlaid onto it.

Return to Safestore is a molding command that causes the selected Safestore data to be applied to the associated Datastore point in order to return the training session to the point at which the Safestore was taken. The Return to Safestore command is passed to the PTSs to inform them of the request to re-initialize to the specified Safestore point. If this feature is not implemented in the PTS, the PTS re-initializes to the last IC point selected. In either case, the PTSs report that the reset has completed and go to Freeze.

The Terminate command stops the simulation exercise in an orderly manner. The PTSs stop executing the payload models in real-time and return to a Ready state listening for further commands from the SSTF.

The Hold command informs the PTSs that the training session has temporarily suspended real-time execution and the communication between the CSIOP and PTSs may be suspended for an indefinite period of time. The PTSs also enter a suspended state of execution and wait for communication to resume. Normally, the next message will be a molding command, but it could be a command to re-establish communication.

The interface asset for a crew station is the Crew Station Input/Output Processor (CSIOP). Therefore, all payload simulators are interfaced through a CSIOP. If they are installed in the US LAB they interface through the US LAB CSIOP; if installed in the PSSA then they interface through the PSSA CSIOP. As stated earlier, the Session Host builds a Mode Request Specification that the CSIOP uses to construct a Mode Change message. This message is sent to the payload simulator by way of the PSimNet. The Payload simulator responds to the messages as specified herein.

Figure 6:
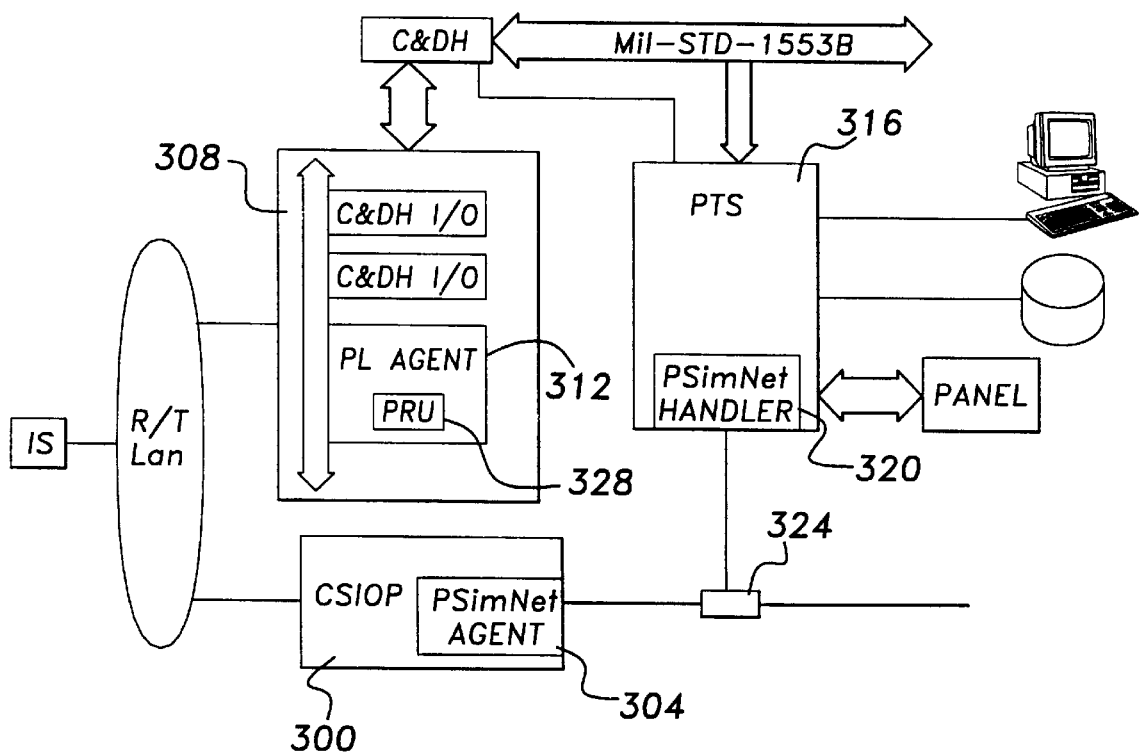
FIG. 6 is a network block diagram which shows the interface software components as used by and connected to the present invention.

Referring to FIG. 6, there are two software items that support payload interfaces residing in the SSTF. The major portion resides in the CSIOP 300 and is called the CSIOP PSimNet Agent 304. Another, residing in the session host computer 308 called the Payload Agent 312 works in conjunction with the CSIOP agent. On the payload simulator 316, there is a PSimNet Handler 320 that interprets the messages coming over the PSimNet 324 routes them to the appropriate place and acts on them.

The CSIOP PSimNet Agent 304 has the responsibility to build commands and data messages for transfer to the payload simulator 316. The messages are generated and sent by the CSIOP PSimNet Agent 304. The agent also transfers messages to the session host computer 308 and instructor station.

The message passing scheme requires that data be registered in a SSTF unique database for Instructor Station display. The CSIOP PSimNet agent 304 performs the registration for the payload displayable parameters. One CSIOP PSimNet Agent 304 is provided for each payload simulator 316.

The Payload Resource Utilization (PRU) model 328 provides a minimal simulation of power consumption and consumption of other resources utilization when the payload simulator 316 is not connected or is inoperable.

The Payload Simulator implements an Interface Handler that interprets the PSimNet command protocol. The general protocol is defined in FIG. 7.

Figure 7:
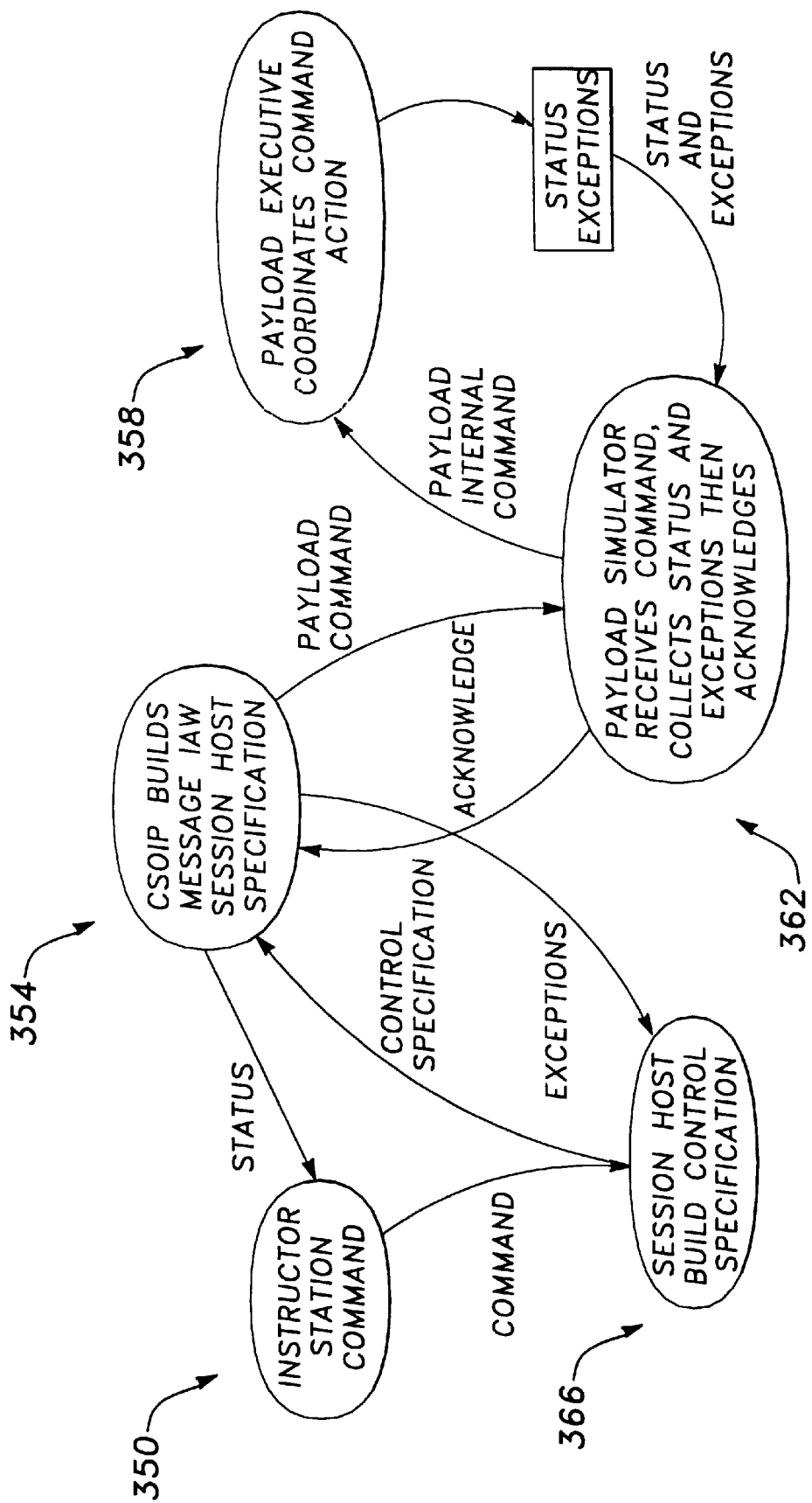
FIG. 7 is a data flow diagram showing the flow of command data among software modules within the exemplary space station training facility.

Referring to FIG. 7, the SSTF Instructor Operator Station (IOS 350) receives simulator control commands from the Instructor and passes them to the Training System Manager (TSM) 366 which builds a Control Specification for transmittal to the CSIOP PSimNet Agent 354. The CSIOP PSimNet Agent 354 builds a simulator control message and sends this message over the PSimNet to the PTS PSimNet Handler 362. The PTS PSimNet Handler 362 parses the message and forwards the message to the intended PTS software component 358. It also generates an acknowledgment message as appropriate and returns it to the CSIOP PSimNet Agent 354. The PTS software component 358 processes the simulator control message and problems are reported back to the PTS PSimNet Handler 362 which may be propagated all the way back to the IOS 350. A similar flow of messages exists for the other message types.

The Internet Protocol Suite (IPS), which is also known as the Transmission Control Protocol/Internet Protocol (TCP/

IP) protocol suite, is employed for the underlying routing and transport functions for PSimNet communications of simulation data between the SSTF host and PTSs.

Ethernet is used for connecting the PTSs with the SSTF CSIOP interface computer. It uses a 4-byte Cyclic Redundancy Check (CRC) value to validate each frame of message traffic.

The User Datagram Protocol (UDP) protocol employed as the underlying transport protocol provides a fast transfer of datagrams, but delivery is not reliable. UDP does not check for flow control, lost datagrams, duplicate datagrams, out-of-sequence datagrams, etc.

Figure 8:
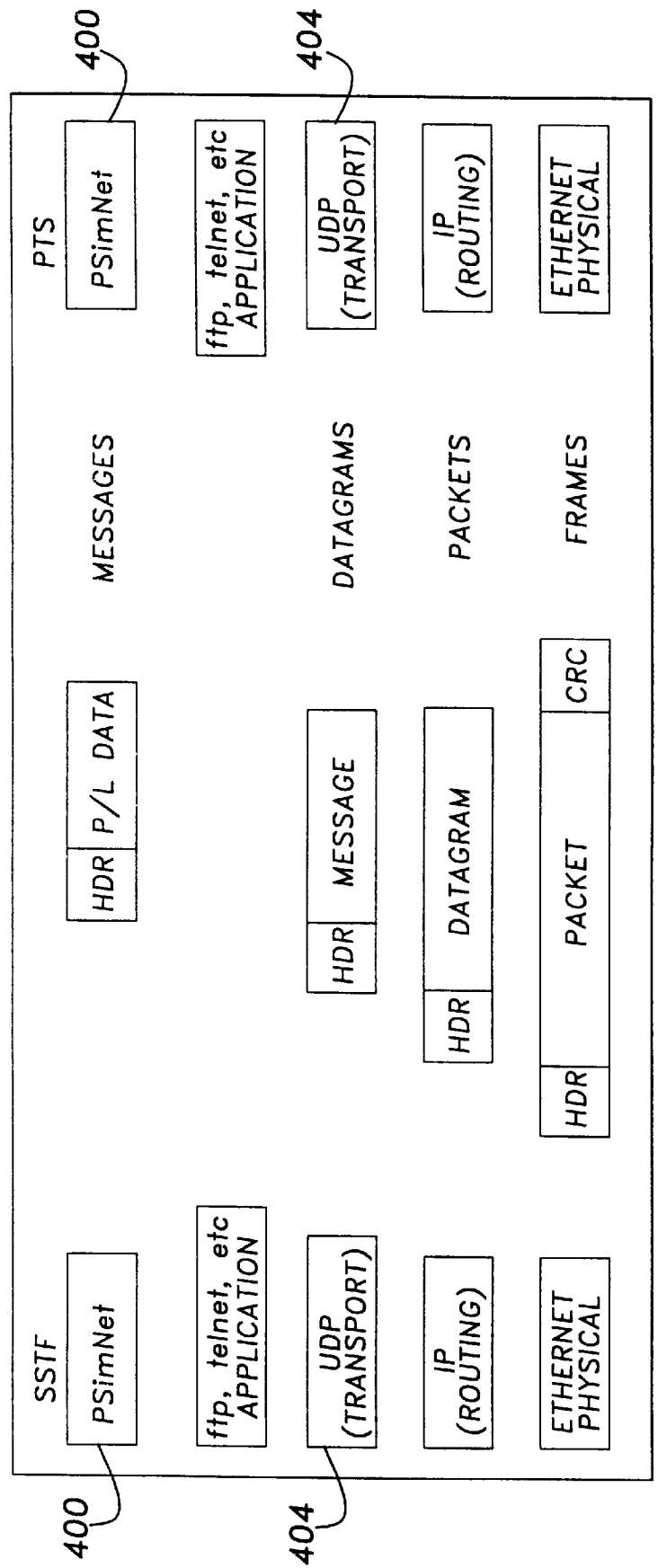
FIG. 8 is a block diagram showing the protocol suite stack.

The IPS protocol stack is shown in FIG. 8. PSimNet 400 handles the message user level while UDP 404 handles the transport level.

PSimNet is the user level protocol that has been developed to meet the communication needs of the PTSs. It defines the communication protocol to support among other things the following:

bring a PTS into the specified SSTF training session
  a. extend SSTF simulator control and training features to each PTS
  b. extend instructor controls to each PTS
  c. exchange payload and Space Station systems data
  d. implement checks and controls for lost and duplicated datagrams UDP was chosen because of its efficiency to meet real-time communication requirements. Specifically, real-time messages fall into two categories: those that are delivery-critical and those that are time-critical. Delivery-critical messages must be received or the integrity of the simulation is jeopardized. Delivery is assured by requiring the receiver to return an acknowledgment message. An example is an instructor command to go to Run.

Time-critical messages are those for which the data in these message looses its value very quickly. Time critical messages are generally cyclic. If a message is lost, another message will soon follow with updated data. An example is a cyclic transfer of a simulation value from the SSTF host system to a PTS.

Timers are used in conjunction with acknowledgments to detect lost messages. Each message requiring an acknowledgment has a timer associated with it. Expiration of the timer is known as a time-out and is an indication that either communication has been disrupted or the message or its acknowledgment was lost. If the message was received but the acknowledgment was lost, re-sending the message would result in a duplicate message.

Sequence numbers allow detection of duplicate messages. Any message resent should use the same sequence number as the original message. Any message with a duplicate sequence number should be ignored. Independent number sequences are to be used for messages from the CSIOP to each of the PTSs, and for messages from each PTS to the CSIOP.

The PTSs are slaved to the CSIOP. They accept and react to each message received. The CSIOP is responsible for maintaining communication with each PTS and will attempt to re-establish communications if it detects that communication is lost. There are occasions when the CSIOP temporarily suspends all communications with the PTSs. Therefore, the PTSs cannot implement time-out logic but rely on the CSIOP to keep communications alive.

Each PTS will be assigned an IP address when installed into the SSTF complex. A multicast address is assigned dynamically during the connect phase of a training session to group the selected PTSs. This multicast group address is temporary and is valid only for the duration of the training session.

The IP address for the CSIOP will be provided in the Connect message. This dynamic assignment supports the capability for the PTSs to be interchanged between the LAB and the PSSA.

Each of the PTSs uses input port number 2100. The output port number is provided in the Connect message.

Data exchanged between the PTSs and the CSIOP conform to the PSimNet standard data structures. The Floating point format and the byte addressing scheme and their compliant formats are described below.

Floating point data that is exchanged with the SSTF conforms to the IEEE-754 floating point standard. Floating point data may be defined as single precision (32 bits) or double precision (64 bits), depending on the precision required.

PSimNet uses the big endian, or network order, byte addressing scheme where bytes are addressed in ascending order. Data exchanged between the SSTF and the PTSs comply with the big endian byte order. Depending on the byte addressing scheme used by the PTS computer and the type of data being transferred, byte swapping may be required.

Messages transmitted via the PSimNet adhere to the message formats Definitions of variable types used in the format definitions are as follows:

| Var Type | Description |
| --- | --- |
| boolean | 8-bit field where 0 = False, 1 = True. |
| char | 8-bit ASCII character. |
| double | 64-bit IEEE-754 floating point number. Starts on a double word (64-bit) boundary. |
| float | 32-bit IEEE-754 floating point number. Starts on a full word (32-bit) boundary. |
| in_addr | Structure comprised of:<br>    unsigned_32   IP Address<br>Starts on a full word (32-bits) boundary. |
| int_8 | 8-bit signed integer. |
| int_16 | 16-bit signed integer. Starts on a half word (16-bit) boundary. |
| int_32 | 32-bit signed integer. Starts on a full word (32-bit) boundary. |
| null_value | Field is set to all zeros |
| string | Array of 8-bit ASCII characters. (Uses length attribute). |
| time | Structure comprised of:<br>    int_32 Year<br>    int_32 Day of Year<br>    int_32 Milliseconds past Midnight<br>Starts on a full word (32-bits) boundary. |
| unsigned_8 | 8-bit unsigned integer (range is 0 to $2^{**}8-1$). |
| unsigned_16 | 16-bit unsigned integer (range is 0 to $2^{**}16-1$). Starts on a half word (16-bit) boundary. |
| unsigned_32 | 32-bit unsigned integer (range is 0 to $2^{**}32-1$). Starts on a full word (32-bit) boundary. |

Every message begins with a header with a format as follows:

| 0 | | 8 | 16 | | 24 |
| --- | --- | --- | --- | --- | --- |
| Src_ID | | | Dest_ID | | |
| Msg_Type | | Ver | Len | | |
| Seq_num | | | Ack_num | | | where:
  Src_ID—(int_16) A unique simulation identifier for the originator of the message
    1=LAB CSIOP
    n=Payload Identifier (Assigned in PSID forms)

Dest_D—(int_16) A unique simulation identifier for the receiver of the message
  1=LAB CSIOP
  n=Payload Identifier (Assigned in PSID forms)
Msg_Type—(unsigned_8) Defines the contents of this message
  1=Connect message
  2=Simulation Control message
  3=Station data message
  4=Malfunction Control message
  5=Poke message
  7=(Reserved)
  9=Error Acknowledgment message
  11=PTS Ready message
  12=Simulation Control Acknowledgment message
  13=PTS message
  14=Malfunction Acknowledgment message
  15=Poke Acknowledgment message
  17=(Reserved)
  19=Error message
  100=Ping message
  101=Ping Acknowledgment message
  121=Simulation Control Initialization Complete message
  122=Simulation Control Datastore Complete message
Ver—(int_8) Specifies the version level of this message format.
This allows the protocol to interoperate at different revision levels so message format changes made for one payload do not necessarily force every payload to immediately adopt the new format.
Len—(int_16) Specifies the length in bytes (octets) of the entire message, including the Header.
Seq_Num—(unsigned_16) Message sequence number, starting at an arbitrary value and incremented by one for each (new) message sent. The starting value is specified in the Connect message for the CSIOP to PTS message and in the PTS Ready messages for the PTS to CSIOP message. This number is modulo 2**16.
Ack_Num—(unsigned_16) Message sequence number that is being acknowledged. Zero if not applicable.

Connection between the CSIOP payload agent and each PTS in the training session is established as follows:

Each PTS opens an input port and blocks on a read. At this point, the PTS is in the Ready state.

The CSIOP payload agent (LAB or PSSA) opens an output port and broadcasts the Connect message to all nodes on the PSimNet.

Each PTS in the Ready state receives the connect message and replies with a PTS Ready message. At this point, the PTS is considered to be connected and in the Session-Active state. PTSs already assigned to a training session are not in the Ready state and should ignore this Connect message.

The CSIOP payload agent builds a list of active PTSs that are to be included in this training mission.

The remaining PTSs that responded are sent a Simulation Control message with mode set to Terminated which returns them to the Ready state.

At this point the CSIOP payload agent has a list of on-line PTSs and has assigned a multicast group address to them. The CSIOP payload agent will inform the PRU system of missing PTSs, and will inform the Training System Manager that its configuration phase is complete.

The Connect message is broadcast over the PSimNet to initiate establishment of a connection to each of the PTSs that are to be assigned to the current training session. This message consists of the Header as previously defined and the CONNECT_MSG_PART. The CONNECT_MSG_PART includes the IP address of the originating CSIOP and the multicast group IP number.

The content and format of the CONNECT_MSG_PART is as follows:

| | CSIOP_Addr | |
|---|---|---|
| | Group_Addr | |
| Output_Port_Num | Session_Id_Len | spare |
| | GMT | |
| | Session_Id | | where:
  CSIOP_Addr—(in_addr) IP address of the CSIOP Payload agent.
  Group_Addr—(in_addr) Multicast group IP address for this training session.
  Output_Port_Num—(int_16) Port number to use for sending messages to CSIOP.
  Session_Id_Len—(int_8) Number of ASCII characters in Session_Id
  spare—(int_8) null_value, not used.
  GMT—(time) Greenwich Mean Time to set PTS to.
  Session_Id—(string) Alphanumeric name of this training session.

If a connection is not already established between this PTS and the CSIOP, then the PTS opens an output socket and reply with the PTS Ready message to the CSIOP. Otherwise, the Connect message may be a broadcast message from another training session starting up or recovery from a training session load crash. Therefore, if the Connect message specifies a different training session from the one the PTS is currently in, the PTS ignores the message; else the PTS considers this message a re-start command and reply with the PTS Ready message.

The reply message consists of the Header as previously shown and the PTS_RDY_PART. The format of the PTS_RDY_PART is as follows:

| | PTS_Addr | |
|---|---|---|
| Next_IC_Num | | spare |
| | Config_Data | | where:
  PTS_Addr—(in_addr) IP address of this PTS.
  Next_IC_Num—(int_16) Next available IC number.
  spare—(int_16) null_value, not currently used.
  Config_Data—Message block containing "one-pass" data. This configuration-type data is defined in the PSID with rate=0.

This message block may contain several variables of different types and may be different for each PTS.

Simulation Control messages are messages that affect the simulation environment. Examples include changing the simulation mode or creating a Datastore point to allow resetting of the simulation exercise at a later time. These messages are delivery-critical. If they are not successfully delivered, the integrity of the simulation will be compromised.

This message which is comprised of the Header and the SIM_CTL_MSG_PART will be sent to all PTSs in the subject training exercise aperiodically as required. The PTSs reply with a Simulator Control Acknowledgment message so that receipt of the message by each PTS can be verified. Some of these commands require an indefinite amount of time to complete resulting in the PTSs being in a suspended state of execution. In these cases, an additional acknowledgment is required to inform the CSIOP when each PTS has completed the command.

Duplicate Simulation Control messages are possible. In these cases, the duplicate messages are acknowledged using the same acknowledgment data as in the original acknowledgment message.

Not all of the modes will be applicable to every PTS. The TST will establish the level of fidelity required for each payload. Some of this information may not be used by every PTS.

The content and format of the SIM_CTL_MSG_PART is as follows:

| Mode | Safe-Store_Num | IC_Num |
|------|----------------|--------|
|      | Activation_Time |       |
|      | SGMT           |        | where:
- Mode—(int_8) The new mode the PTS is to go to at the Activation time.
  - 1=Initialization (Initialize to the new IC point)
  - 2=Datastore (Record a Datastore point)
  - 3=Freeze
  - 4=Run
  - 5=Safestore (Record a Safestore point)
  - 6=Return to Safestore point (Return to the selected IC point, then update with selected Safestore data)
  - 8=Hold (Suspend real-time execution)
  - 9=Terminated
- Safe_Store_Num—(int_8) Safe Store number to return to. (Only relevant to Safestore and Return to Safestore).
- IC_Num—(int_16) IC number. (Not relevant to Freeze, Run, Hold, and Terminated).
- Activation_Time—(time) GMT time to effect the mode change.
- SGMT—(time) New Simulated GMT time to use at Activation Time.

Each PTS acknowledges receipt of Simulator Control messages even if the feature contained in the message is not implemented. The acknowledgment simply means that the message was received and understood, not that it was successfully completed.

The Header suffices as the Simulator Control Acknowledgment message.

Each PTS sends the Initialization Complete message when commanded to initialize and the initialization has completed. When initialization has completed, the PTS goes to the Hold mode. This Simulation Control Initialization Complete message is sent even if this feature is not implemented.

The Header suffices as the Simulator Control Initialization Complete Acknowledgment message.

Each PTS sends the Datastore Complete message when commanded to create a datastore point and Datastore has completed. When Datastore has completed, the PTS goes to the Hold mode. The Simulation Control Datastore Complete message consists of the Header and the SIM_CTL_DS_PART and is sent even if this feature is not implemented.

The content and format of the SIM_CTL_DS_PART is as follows:

| Next_IC_Num | spare |
|-------------|-------| where:
- Next_IC_Num—(int_16) Next available IC number.
- spare—(int_16) null_value, not currently used.

Each PTS sends the Initialization Complete message when commanded to return a safestore point and the initialization has completed. When the Return to Safestore initialization has completed, the PTS goes to the Hold mode. This Simulation Control Initialization Complete message is sent even ff this feature is not implemented.

The Header suffices as the Simulator Control Initialization Complete Acknowledgment message.

ISS systems simulation data will be sent to each PTS periodically. The content of these messages will be as defined on the PTS Simulator Interface Definition (PSID) forms. ISS simulation data may be sent at varying rates to minimize LAN traffic. These messages are considered time-critical.

Station data messages consist of the Header and the STATION_MSGi_PART, where i indicates the periodic transfer rate.

Each PTS periodically sends PTS Data Messages containing PTS systems data to the SSTF system host, via the CSIOP. The contents of these messages are defined in the PSID forms. Payload data may be sent at varying rates to minimize LAN traffic. These messages are considered time-critical.

PTS Data messages consist of the Header and the PTS_MSGi_PART, where it indicates the periodic transfer rate.

Malfunctions are simulated faults which can be inserted and removed by an Instructor using the Malfunction Control page at an IOS. Malfunction messages will be sent aperiodically whenever a new payload malfunction is activated or an existing payload malfunction is removed. These messages are delivery-critical. If they are not successfully delivered, the integrity of the simulation will be compromised.

Malfunction messages consist of the Header and the MALF_MSG_PART. The Len field in the Header specifies the total length of the malfunction message, including its Header. The message may include multiple malfunctions. The Malfunction message format will be dynamically created using the fields as described below.

The MALF_MSG_PART is comprised of one of more blocks of malfunction data. Each block will be an integral multiple of 8 bytes to accommodate the grouping of malfunction message blocks, since some of the malfunction blocks may contain 64-bit data. The different possible malfunction message blocks are described below.

The Cmd field in the malfunction data block will be set to a value of 1 to indicate that this block contains information to activate a malfunction. The Malf_Type field will identify the type of malfunction. The block's length will depend on the value in the Malf_Type field. The Malf_ID_Len field will contain the number of ASCII characters in the malfunction term identifier. The Malf_ID field will contain the malfunction term identifier in ASCII characters.

The format of the MALF_MSG_PART for the Simple Malfunction type is as follows:

| Cmd = 1 | Malf_Type = "S" | Malf_ID_Len |
|---------|-----------------|-------------|
|         | Malf_ID         |             |
|         | spare           |             | where:
Cmd—(int_8) Command to insert or remove this malfunction.
1=insert malfunction
2=remove malfunction
Malf_Type—(char) Type of Malfunction
'S'=Simple malfunction
'O'=Option malfunction
'1'=P1 malfunction
'2'=P2 malfunction
Malf_ID_Len—(int_16) Number of 8-bit ASCII characters in the PTS term name excluding pad characters.
Malf_ID—(string, 32 bytes) Name of PTS term to be set for this malfunction, padded with null_value.
spare—(int_32) null_value.
The format of the MALF_MSG_PART for the Option Malfunction type is as follows:

| Cmd = 1 | Malf_Type = "O" | Malf_ID_Len |
|---------|-----------------|-------------|
|         | Malf_ID         |             |
|         | value           |             | where:
Value (int_32) Value to which the PTS term specified by Malf_ID is set.
The other fields are as defined for the Simple Malfunction Type. The format of the MALF_MSG_PART for the P1 Malfunction type is as follows:

| Cmd = 1 | Malf_Type = "1" | Malf_ID_Len |
|---------|-----------------|-------------|
|         | Malf_ID         |             |
|         | Value           |             |
|         | spare           |             | where:
Value—(double) Value to which the PTS term specified by the
Malf_ID is set.
spare—(int_32) null_value.
The other fields are as defined for the Simple Malfunction Type.
The format of the MALF_MSG_PART for the P2 Malfunction type is as follows:

| CMD = 1 | Malf_Type = "2" | Malf_ID_Len |
|---------|-----------------|-------------|
|         | Malf_ID         |             |
|         | Scale           |             |
|         | Bias            |             |
|         | Spare           |             | where:
Scale—(double) Value to which the scale value for the PTS term specified by the Malf_ID is set.
Bias—(double) Value to which the bias value for the PTS term specified by the Malf_ID is set.
spare—(int_32) null_value.
The other fields are as defined for the Simple Malfunction Type.
The Cmd field in the MALF_MSG_PART is set to a 2 to indicate that this block contains information to clear a malfunction. The Malf_Type field is not used. The Malf_ID_Len field contains the number of ASCII characters in the malfunction term identifier. The Malf_ID field contains the malfunction term identifier as ASCII characters.
The format of the MALF_MSG_PART for the Remove Malfunction command is as follows:

| CMD = 2 | spare   | Malf_ID_Len |
|---------|---------|-------------|
|         | Malf_ID |             |
|         | Spare   |             | where:
Cmd.—(int_8) Command to insert or remove this malfunction.
1=insert malfunction
2=remove malfunction
spare—(int_8) null_value, Not used.
Malf_ID_Len—(int_16) Number of 8-bit ASCII characters in Malf_ID.
Malf_ID—(string, 32 bytes) Malfunction term name, padded with
null_value.
spare—(int_32) null_value.
The Malfunction Acknowledgment message contains only the Header.

The capability to Look and Enter into a PTS system is provided. The terms on the PTS Data PSID form that have been declared as "Lookable" are registered with the SSTF simulation data base system and are periodically transferred to the SSTF as PTS data. Those terms that are also declared as "Enterable" are aperiodically sent to the PTS only when an instructor selects one of these terms and changes it value. The Poke message is dynamically built and sent to the designated PTS only when a PTS term is changed from the IOS. Integrity of the Enter function is achieved by requiring an acknowledgment message from the receiver.
The Poke message consists of the Header and the POKE_MSG_PART.
The POKE_MSG_PART is comprised of one or more message blocks where a message block is defined as follows:

| Data_Value_Len | Name_Len |
|----------------|----------|
| Data_Value     |          |
| Term_Name      |          |
| spare          |          | where:
Data_Value_Len—(int_16) Size of the term in bytes. Size of the term is dependent on its type as defined in the PSID form.
Name_Len—(int_16) Number of ASCII characters in the Term_Name.
Data_Value—(field is 40 bytes of unspecified type) Contains the value of the Term_Name in its native type. The field is padded as required with null_values. (The 40-bytes length was chosen to correspond with the maximum size that the SSTF simulation data base system can support for data values.)

Term_Name—(string, 32 bytes) PTS term name. The field is padded as required with null_values. (The ANSI C language supports 31 unique characters in a label field.)

spare—(int_32) null_value, filler to force next 64-bit boundary.

The Poke Acknowledgment message contains only the Header.

The Error message provides the vehicle for a PTS to report errors to the CSIOP Payload Agent and/or the instructor. These delivery critical messages can be sent aperiodically as the need arises. Only one error can be reported per message, but multiple messages can be sent back-to-back. The Error message consists of the Header and the ERR_MSG_PART. The format of the ERR_MSG_PART is as follows:

| Err_Num | Severity_Level | Category |
|---|---|---|
| Description (256 characters, blank filled) | | | where:
Err_Num—(int_16) Error number in the range 0 to 99. (These errors will be reported in the range of 20000 to 24999 at the IOS. The CSIOP will incorporate the payload ID and possibly other data in the process of converting them to the proper values).

Severity_Level—(int_8) Level of severity. Use
1 Local—Don't report to SaC for IOS display. Applies primarily to communication type errors.
2 Info_Only—Reported to SaC as just information.
3 Warning—Reported to SaC as an abnormal condition where the training exercise will likely be in a degraded configuration.
4 Error—Reported to SaC as a catastrophic error; the training exercise is in jeopardy.

Category—(int_8) Identifies the component causing the error.
1 Software error
2 Hardware error
3 Configuration error
4 Debug message—to be removed before delivery Description—(string) 256 characters that describe the error condition and possibly a recovery action. The field is padded with blanks. This information is displayed at the IOS and should be as descriptive and informative as possible. An example of a good error message is "Received a negative voltage on Bus 1. Treating it as zero voltage. Payload can be restarted by cycling power on Bus 1 and then providing usable power."

The CSIOP will acknowledge each Error message received using the Header.

Once communication is established, messages are expected to be exchanged cyclically at least once per second. However, there may be situations such that normal communication is suspended for a short and indefinite period of time such as when creating a Datastore point. In this case, and possibly other cases, a message may be needed to determine if a PTS is still connected. These messages should be acknowledged. No response will indicate that the PTS is hung up and is to be manually restarted.

The Ping message consists of the Header and an one word message part containing the SGMT.

The Header with the 'Msg_' Type field set to 101 is returned for each Ping message received.

The Ping Acknowledgment message consists of the Header and the PING_MSG_PART. The format of the PING_MSG_PART is as follows:

| Mode | Session_Id_Len | PTS_Addr Group_Addr | spare |
|---|---|---|---|
| | | SGMT | |
| | | GMT | |
| | | Session_Id | | where:
PTS_Addr—(in_addr) IP address of this PTS.
Group_Addr—(in_addr) Multicast group IP address for this training session.
Mode—(int_8) Mode PTS is currently in.
Session_Id_Len—(int_8) Number of ASCII characters in Session_Id name.
spare—(int_16) null value, not currently used.
SGMT—(time) Simulated GMT.
GMT—(time) GMT.
Session_Id—(string) Alphanumeric name of this training session.

Figure 9:
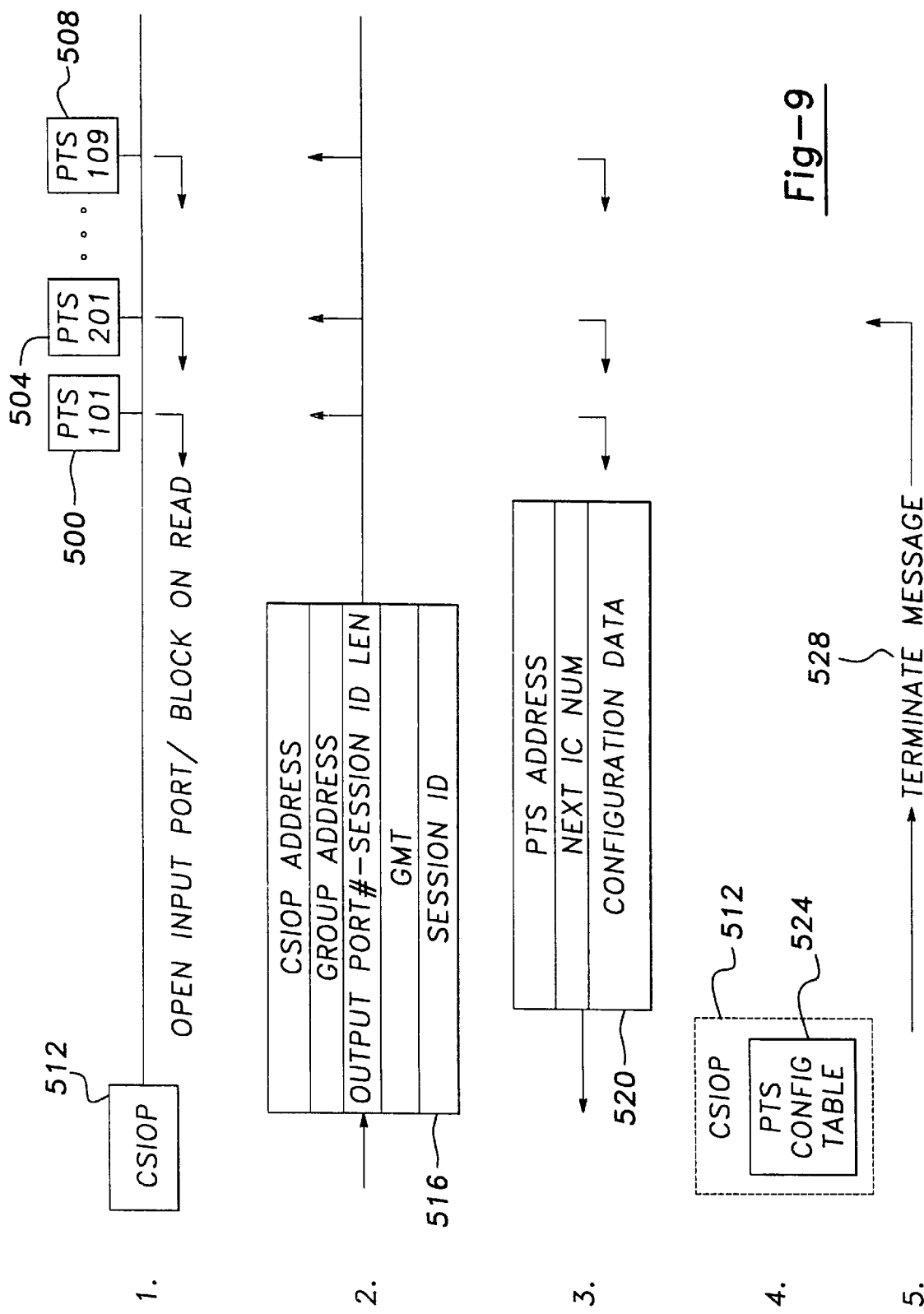
FIG. 9 is time sequence diagram for how the message handling system processes a connect message.

FIG. 9 shows the time sequence processing steps for a CONNECT message which is used to attach PTSs to a specific training session. First each PTS (500, 504, 508) is started and prepared for a training session by opening an output port and blocking on a read. The CSIOP 512 sends a CONNECT message 516 to each PTS (500, 504, 508). Each PTS (500, 504,508) responds with a READY message 520. The CSIOP 512 builds its internal configuration table 524. In this example, PTS 504 has been determined to not be in this training session and is released via a terminate message 528.

Figure 10:
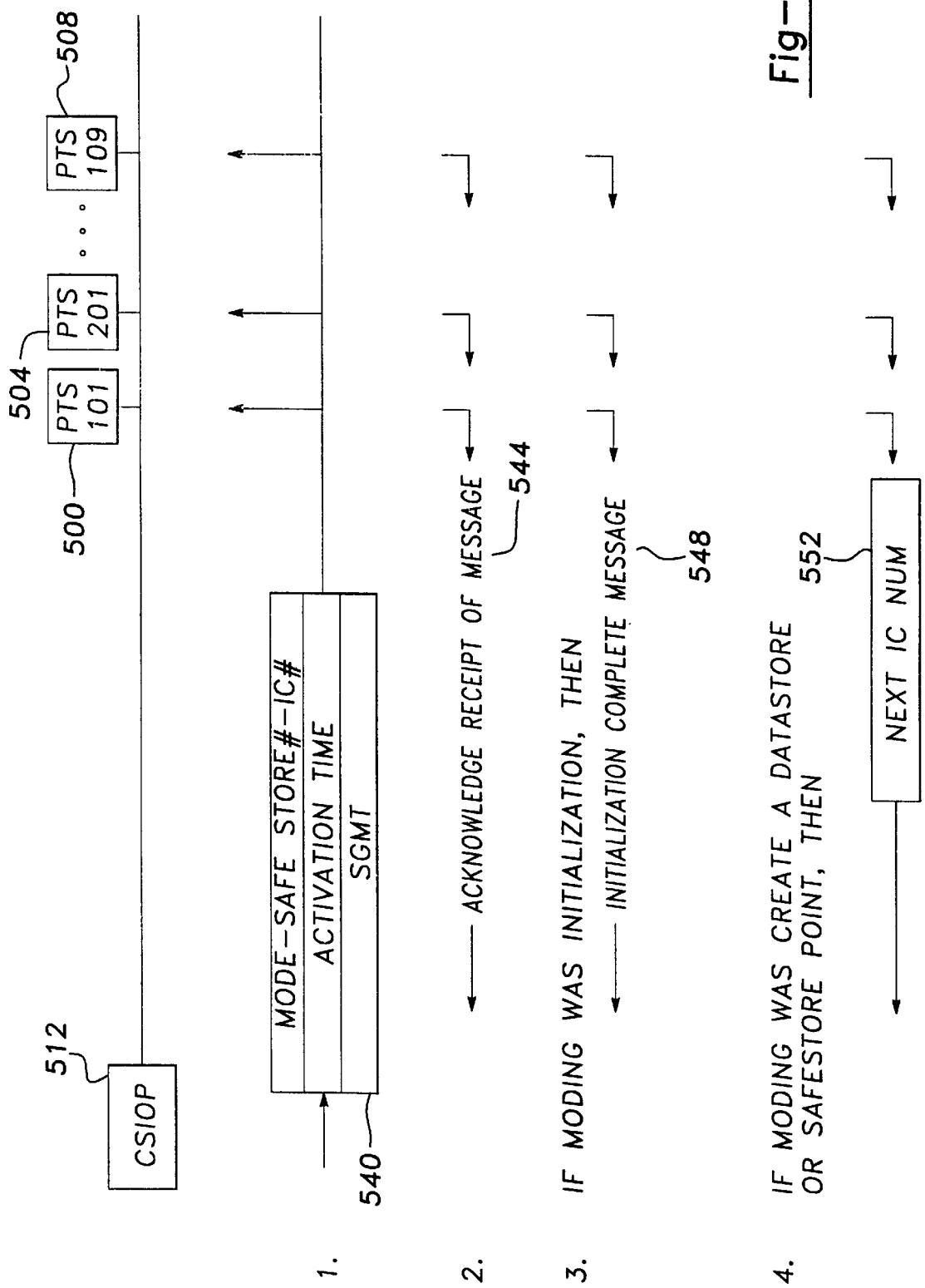
FIG. 10 is a time sequence block diagram showing how the message handling system processes a simulator control message.

FIG. 10 shows the time sequence processing steps for a simulator control message where the SSTF sends molding and control messages to the PTSs. For this scenario, the training session is entering a new mode. A message 540 with a new mode and if applicable the Safestore or Datastore (IC) number is sent to each attached PTS (500, 504, 508) from the CSIOP 512. Each PTS (500, 504, 508) sends an acknowledgment 544 of the receipt of the message. Also, each PTS (500, 504, 508) informs the CSIOP 512 when it has completed re-initializing with message 548 or saving data for Datastore or Safestore by sending message 552.

Figure 11:
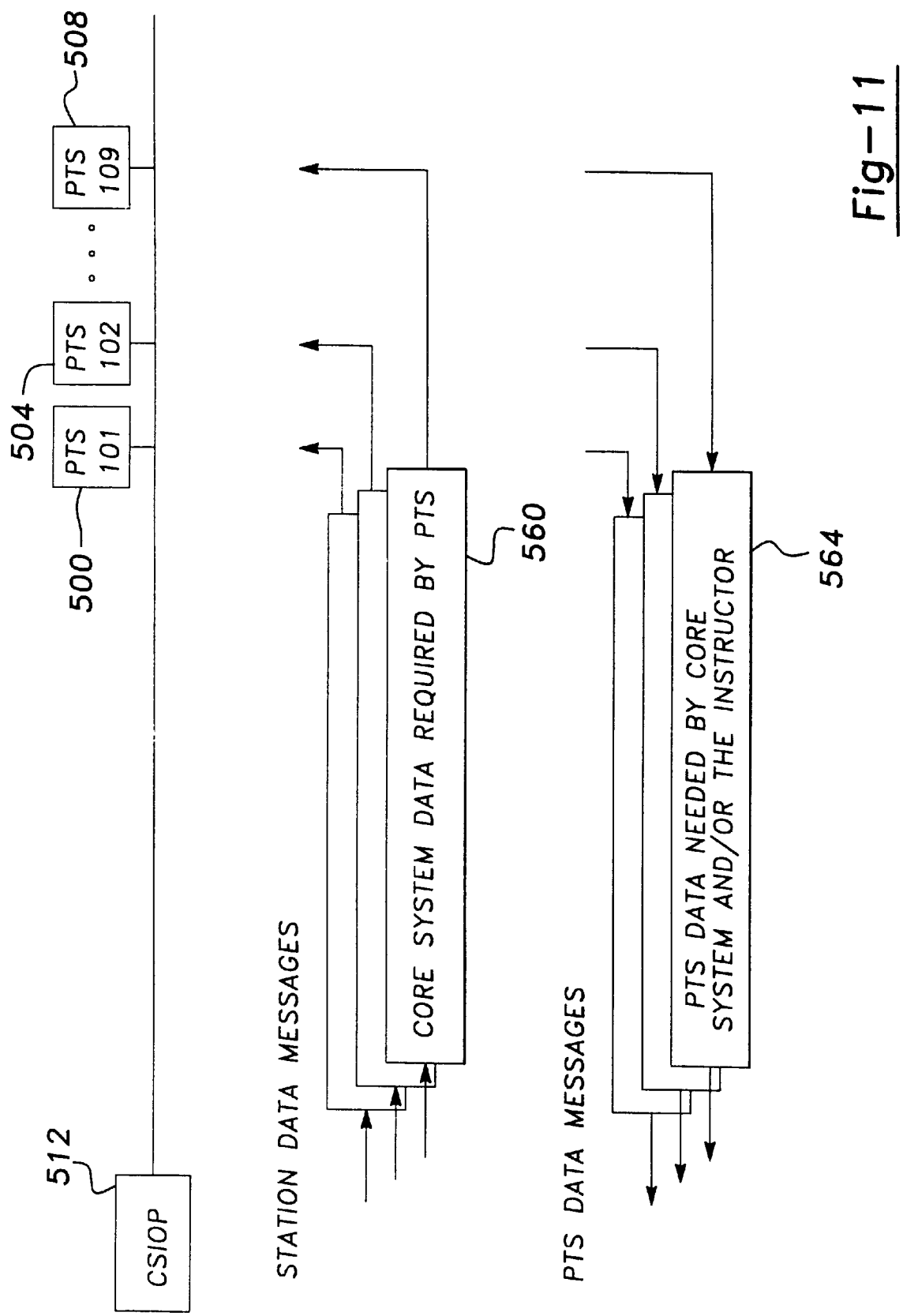
FIG. 11 is a time sequence block diagram showing how the Space Station Training Facility (SSTF) and the payload training simulator (PTS) exchange data messages.

FIG. 11 shows the time sequence processing steps for the SSTF and PTS data messages where data is exchanged between each PTS and the SSTF. The CSIOP 512 sends station data messages 560 which contains core system data required by the PTSs (500, 504, 508). The PTSs (500, 504, 508) also send to the CSIOP 512 PTS data messages 564 which contains the PTS data needed by core systems and the instructor.

Figure 12:
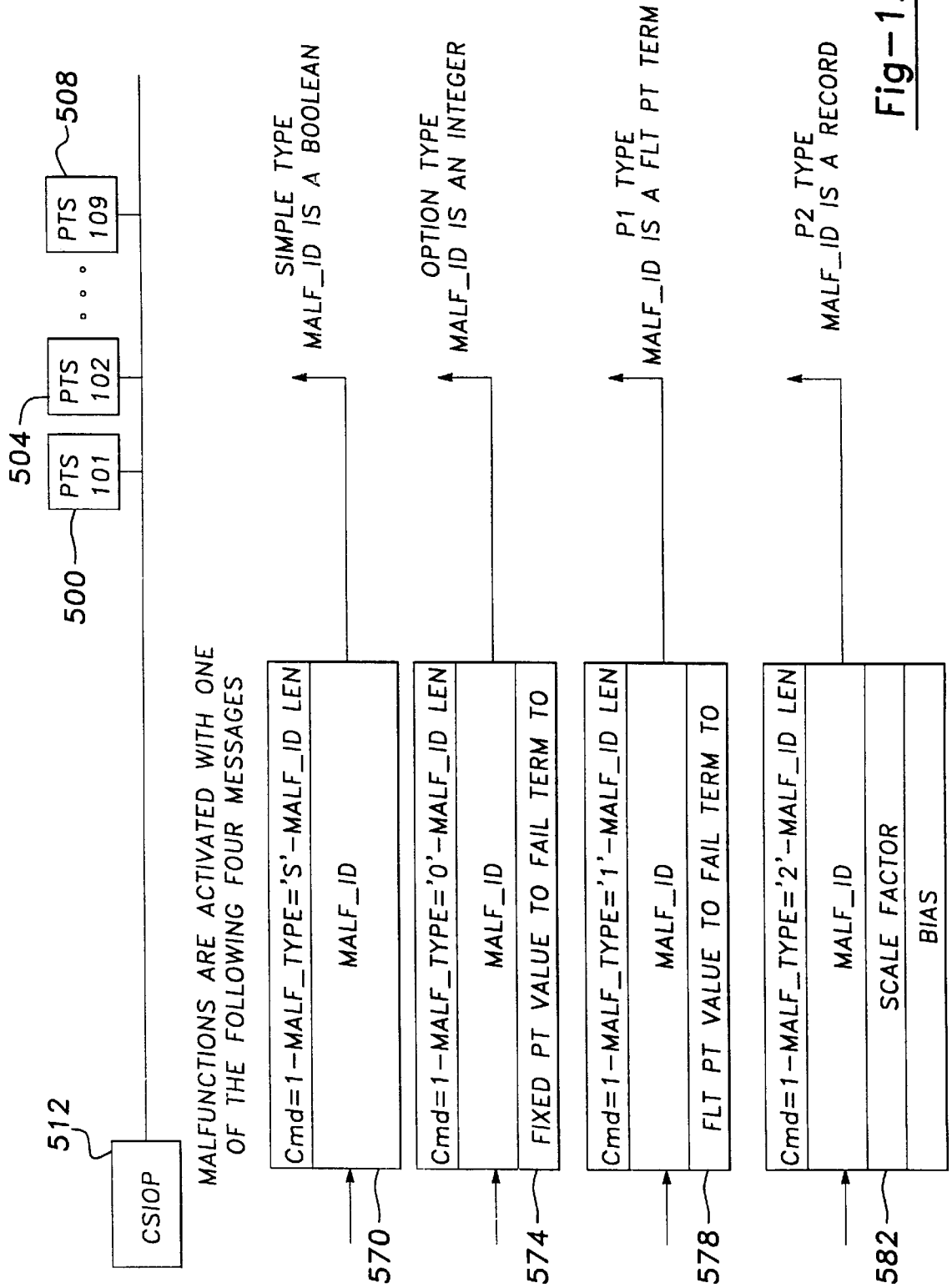
FIG. 12 is a message flow block diagram showing how the message handling system processes malfunction control messages.

FIG. 12 shows the CSIOP 512 sending malfunction messages to a specific PTS (504) where the SSTF instructs the PTS to activate a malfunction. Malfunctions are activated with one of four types of messages. Malfunction message 570 is typified as a simple type where the malfunction id is a boolean. Malfunction message 574 is typified as a option type where the malfunction id is an integer. Malfunction message 578 is typified as a P1 type where the malfunction id is a floating point term. Malfunction message 582 is typified as a P2 type where the malfunction id is a record.

Figure 13:
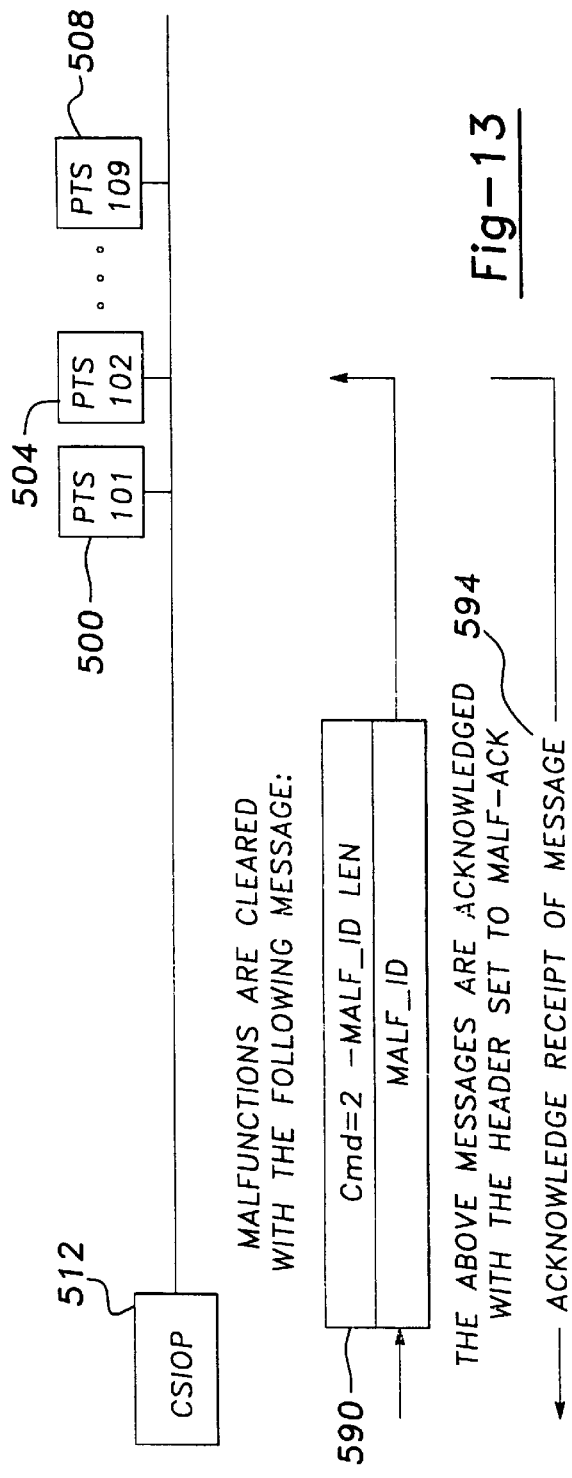
FIG. 13 is a message flow block diagram showing how the message handling system processes a malfunction clear message.

Referring to FIG. 13, the malfunction messages are cleared with message 590 which is sent from the CSIOP 512 to PTS 504. PTS 504 sends an acknowledgment 594.

Figure 14:
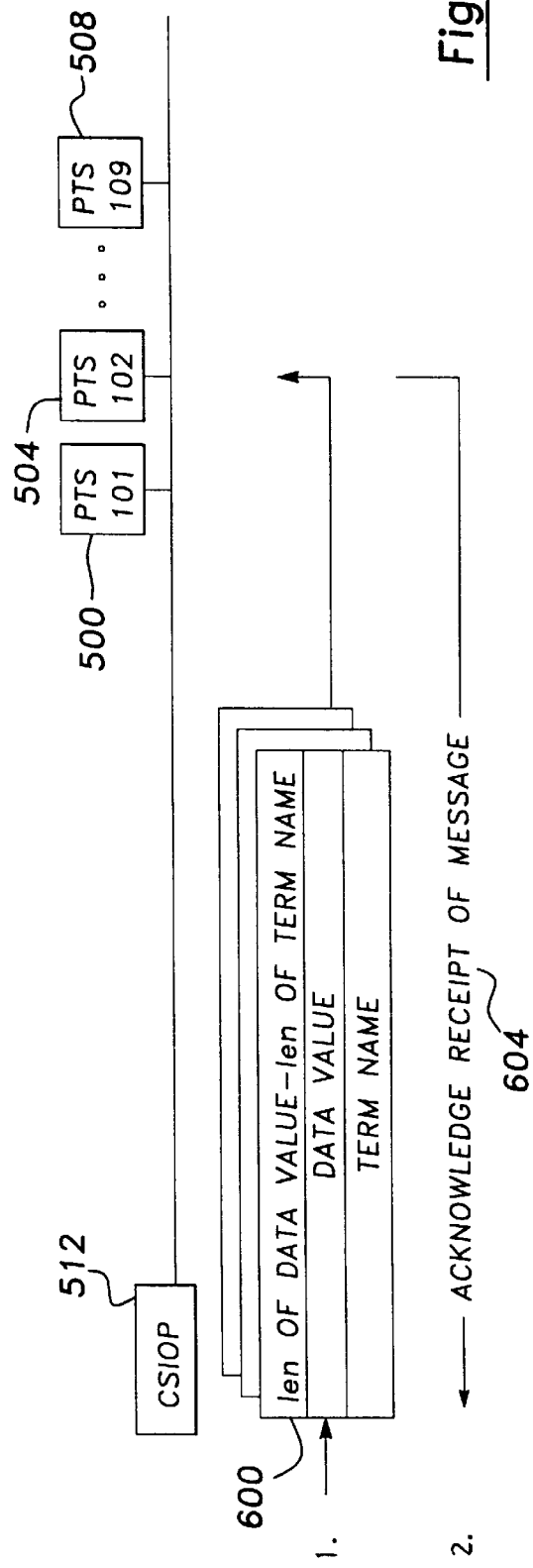
FIG. 14 is a time sequence block diagram showing how the message handling system processes a poke message.

Referring to FIG. 14, the SSTF sends new values to a specified PTS term via a Poke message. Eligible PTS term is registered with SSTF as being a changeable term. The CSIOP 512 sends a Poke message 600 to the specified PTS term in PTS 504. PTS 504 replies with an acknowledgment 604.

Figure 15:
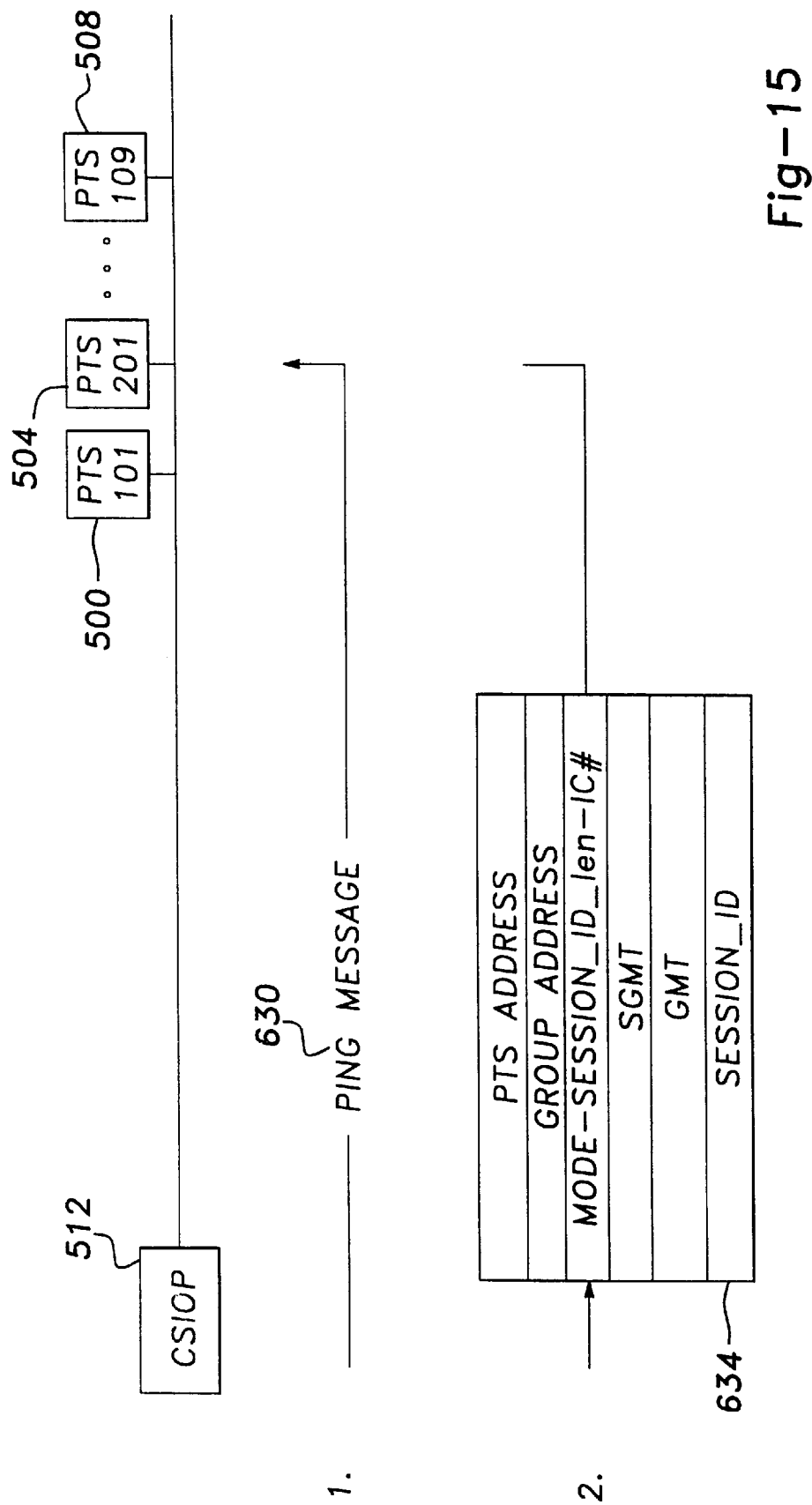
FIG. 15 is a time sequence block diagram showing how the message handling system processes an open communication verification message.

Referring to FIG. 15, the CSIOP 512 sends to PTS 504 a Ping message 630 which is used to verify that communications to a PTS is still open. PTS 504 sends back message 634 in response to identify that it is still open.

Figure 16:
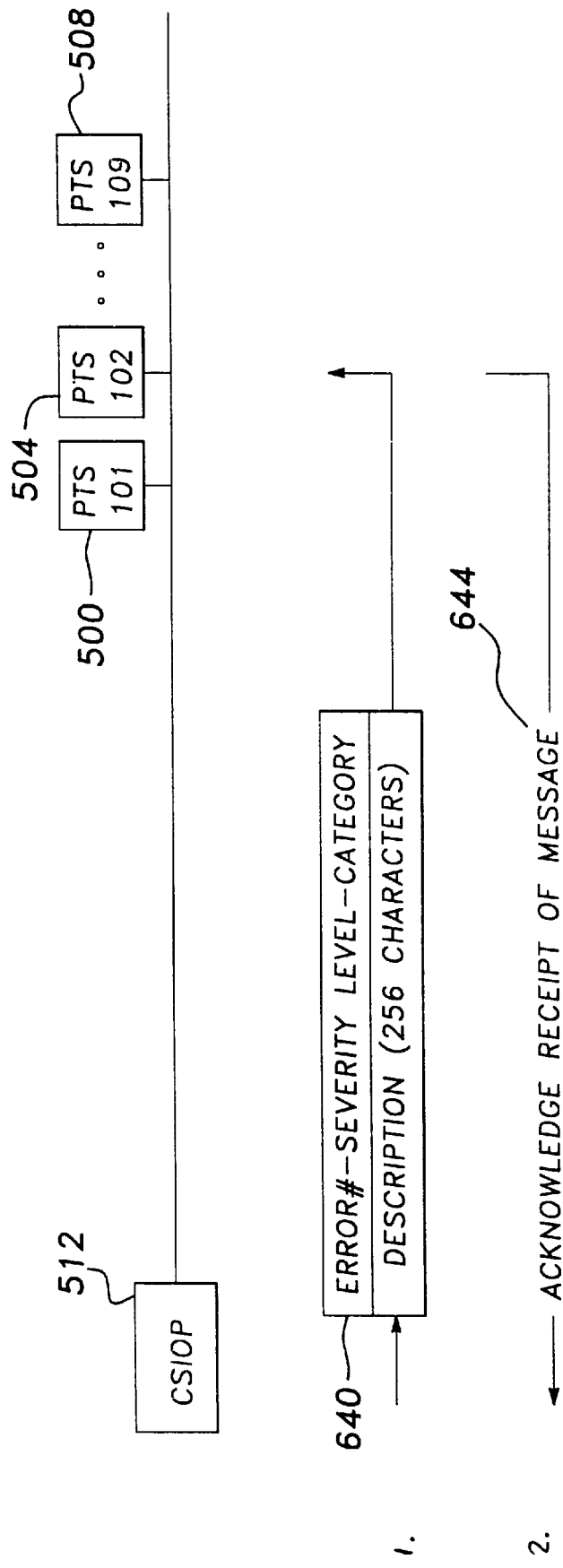
FIG. 16 is a time sequence block diagram showing how the present invention processes error messages.

Referring to FIG. 16, PTS 504 sends to CSIOP 512 an error message 640 wherein the PTS 504 reports errors for the instructor to review. The CSIOP 512 sends back an acknowledgment 644 to PTS 504.

The message handling system has been described in the context of the SSTF but is not limited to that context. For example one commercial application is in a class room consisting of a number of Part Task Trainers (PTT) or Computer Based Trainers (CBT) sharing a common simulated environment, and under the control of a centralized instructor. All of the PTTs would be connected to a single, central host computer that would provide an environment simulation that all use. The instructional features providing mode control of each of the PTTs, situation monitoring for the instructor, and selective insertion of simulated malfunctions would also be provided by the central host. Each of the PTTs are operated independently, each subject to the unique control response of its individual operator, but all operating in a common environment, and under centralized control.

Also, the PSimNet extends to group automobile driver training in a class room environment. Here, the PSimNet is the "backbone" of a distributed network of "Safety Part Task Simulators" (SPaTS). Low cost SPaTS remote units are distributed to auto dealerships. Each SPaTS unit is capable of providing a generic automobile drivers station equipped with standard automobile controls. All SPaTS units would be connected via telephone line using the PSimNet protocol to a centralized host computer. The host computer could by way of a rules database, tailor a "lesson" or a number of lessons, to a new vehicle owner, based for example on the specific VIN (vehicle identification number). Training includes applying the proper techniques for braking control of the automobile.

Furthermore, the PSimNet protocol extends to automobile diagnostic systems at dealer repair facilities. The rules database of an expert system which comprises an amalgamation of the experiences of expert technicians and engineers. Local automotive technicians avail themselves to a virtual "expert" technician. Maintenance frequency, failure and wear data are included and collected on individual VINs. In this application, for example, time critical messages are sent to shut off a car when an unsafe car operating condition has been detected.

The embodiments which have been set forth above were for the purpose of illustration and were not intended to limit the invention. It will be appreciated by those skilled in the art that various changes and modifications may be made to the embodiments described in this specification without departing from the spirit and scope of the invention as defined by the appended claims.

What is claimed is:

1. A Message Handling System for delivering a simulation mode control command message between a first computer and a second computer over a network, said system comprising:

a first computer, said first computer being a simulation controller computer;

a second computer, said second computer being a simulator computer;

a network being connected to said first and said second computer and multiple additional simulator computers;

a message receiver for receiving the message from said first computer, said message having a message delivery type field being indicative of either a time critical delivery characteristic or a delivery critical characteristic;

a message type determinator coupled to said message receiver for determining the message delivery type of said message;

a message delivery selector coupled to said message type determinator for selecting a delivery protocol from a predetermined group of delivery protocols based upon the message delivery type field of said message, said predetermined group of delivery protocols including time critical and delivery critical message protocols, said time critical message protocol delivering messages having said time critical delivery characteristic, said delivery critical message protocol delivering messages having said delivery critical characteristic, said delivery critical message protocol including a message timer for timing the delivery of the message, an acknowledgment for acknowledging, said transported message, and a sequence number for uniquely identifying the message; and a message transporter coupled to said message delivery selector for transporting the message to the second computer using said selected delivery protocol, said message transporter further transporting delivery critical messages to a predetermined subset of said multiple simulation computers.

2. A method for delivering a simulation mode control command message between a first simulation controller computer and a second simulation controller computer over a network connected to multiple simulator computers, said method comprising the steps of:

receiving the message from said first computer, said message having a message delivery type field being indicative of a delivery characteristic, said message delivery type field being indicative of either a time critical delivery characteristic or a delivery critical characteristic;

determining the message delivery type of said message;

selecting a delivery protocol from a predetermined group of delivery protocols based upon the message delivery type field of said message, said predetermined group of delivery protocols including time critical and delivery critical message protocols, said time critical message protocol delivering messages having said time critical delivery characteristic, said delivery critical message protocol delivering messages having said delivery critical characteristic, said delivery critical message protocol including a message timer for timing the delivery of the message, an acknowledgment for acknowledging said transported message, and a sequence number for uniquely identifying the message; and transporting the message to the second computer using said selected delivery protocol, said delivery critical messages being transported to a predetermined subset of said multiple simulation computers.

3. The Method according to claim 2 wherein said message delivery type field is indicative of either a time critical delivery characteristic or a delivery critical characteristic, and wherein said predetermined group of delivery protocols includes time critical and delivery critical message protocols, said time critical message protocol delivering messages having said time critical delivery characteristic, said delivery critical message protocol delivering messages having said delivery critical characteristic.

\* \* \* \* \*